US011240208B2

(12) United States Patent
Yin et al.

(10) Patent No.: US 11,240,208 B2
(45) Date of Patent: Feb. 1, 2022

(54) SPLIT TUNNELING BASED ON CONTENT TYPE TO EXCLUDE CERTAIN NETWORK TRAFFIC FROM A TUNNEL

(71) Applicant: Palo Alto Networks, Inc., Santa Clara, CA (US)

(72) Inventors: Yongjie Yin, Fremont, CA (US); Joby Menon, Cupertino, CA (US); Andrey Tverdokhleb, Cupertino, CA (US); Kevin Yao, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 541 days.

(21) Appl. No.: 15/967,351

(22) Filed: Apr. 30, 2018

(65) Prior Publication Data

US 2019/0334864 A1 Oct. 31, 2019

(51) Int. Cl.
*H04L 29/06* (2006.01)

(52) U.S. Cl.
CPC ........ *H04L 63/029* (2013.01); *H04L 63/0272* (2013.01); *H04L 63/0428* (2013.01); *H04L 63/20* (2013.01)

(58) Field of Classification Search
CPC ...... H04W 8/082; H04L 47/22; H04L 63/029; H04L 63/20; H04L 63/0428; H04L 63/0272
USPC .......................................................... 726/15
See application file for complete search history.

(56) References Cited

U.S. PATENT DOCUMENTS

| 7,036,143 | B1 | 4/2006 | Leung |
| 8,443,435 | B1 | 5/2013 | Schroeder |
| 8,533,780 | B2 | 9/2013 | Parla |
| 8,892,766 | B1 | 11/2014 | Wei |
| 2007/0002834 | A1* | 1/2007 | Taylor ...................... H04L 47/22 370/352 |
| 2011/0026453 | A1* | 2/2011 | Yan ........................ H04W 8/082 370/328 |
| 2011/0154477 | A1* | 6/2011 | Parla ...................... H04L 63/102 726/15 |
| 2014/0201814 | A1* | 7/2014 | Barkie ................. H04L 63/0892 726/4 |
| 2017/0279803 | A1* | 9/2017 | Desai .................. H04L 63/0884 |

OTHER PUBLICATIONS

Cisco White Paper. Cisco Visual Networking Index: Forecast and Methodology, 2016-2021. Jun. 6, 2017.
Split tunneling. Wikipedia, downloaded Apr. 25, 2018.

* cited by examiner

*Primary Examiner* — Bryan F Wright
(74) *Attorney, Agent, or Firm* — Van Pelt, Yi & James LLP

(57) ABSTRACT

Various techniques for split tunneling based on content type are disclosed. In some embodiments, a system, process, and/or computer program product for split tunneling based on content type includes monitoring session traffic received at a data appliance; determining if the session traffic is associated with a first content type; and redirecting the session traffic if the session traffic is associated with the first content type based on a policy.

20 Claims, 8 Drawing Sheets

FIG. 5A

SPLIT TUNNELING BASED ON CONTENT TYPE TO EXCLUDE CERTAIN NETWORK TRAFFIC FROM A TUNNEL

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purposes devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

A virtual private network (VPN) extends a private network and the resources contained in the private network across public (e.g., untrusted) networks such as the Internet. For example, a VPN can enable a host computer to send and receive data across shared or public, untrusted networks by emulating the properties of the private network, such as shares, server access, and printers by establishing and maintaining certain security and management policies of the private network. This is generally implemented by establishing a virtual point-to-point connection through the use of either a dedicated connection or through a secure connection (e.g., secure network communications using various encryption techniques), or a combination of both.

A VPN connection across the Internet logically operates as a wide area network (WAN) link between the sites. A secure connection across the Internet appears to a user as a private network communication. However, this communication actually occurs over a public, untrusted network (e.g., the Internet), which is, thus, referred to as a virtual private network.

BRIEF DESCRIPTION OF THE DRAWINGS

Various embodiments of the invention are disclosed in the following detailed description and the accompanying drawings.

FIGS. 5A and 5B illustrate an embodiment of an interface for providing split tunneling based on content type in accordance with some embodiments.

DETAILED DESCRIPTION

Figure 1:
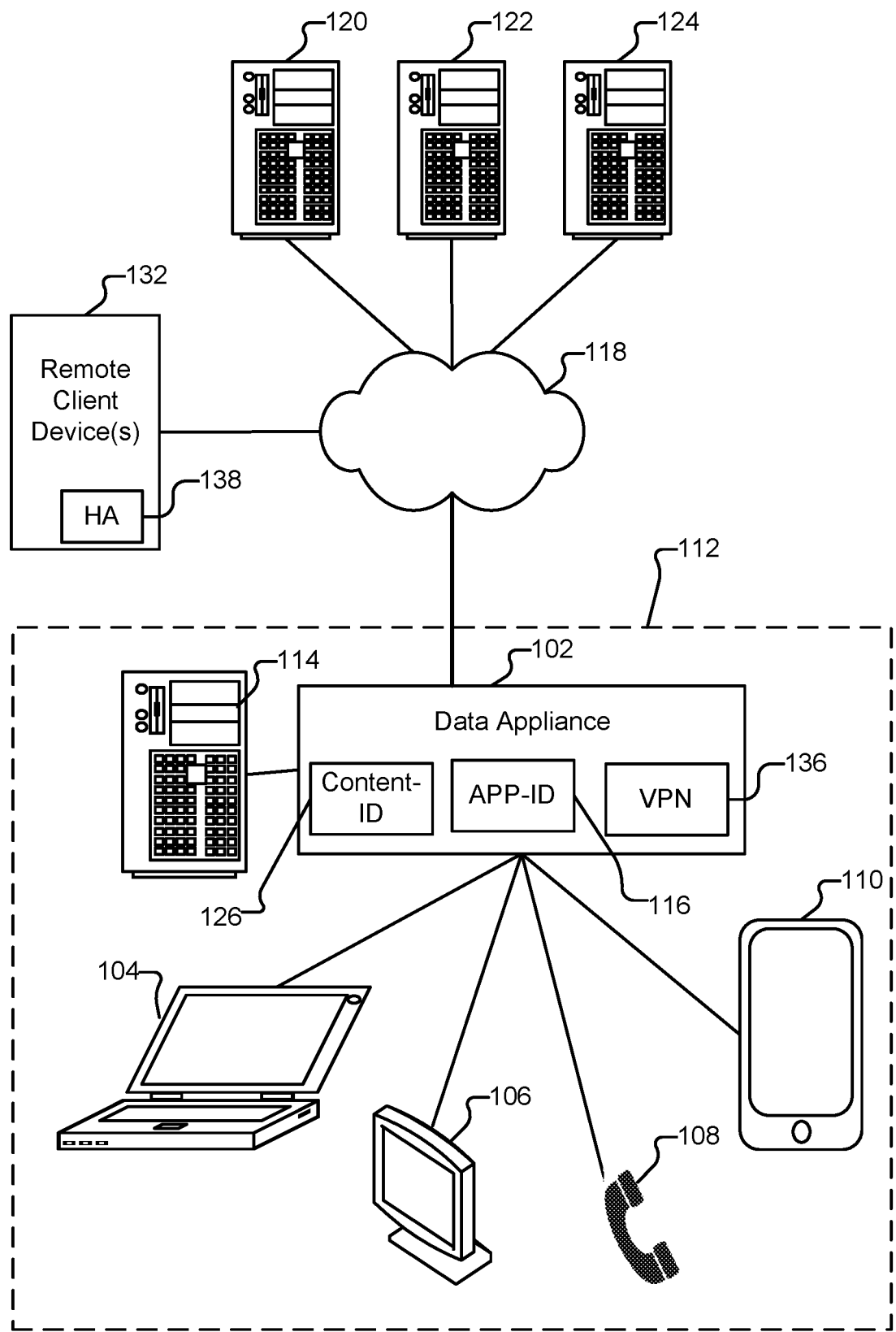
FIG. 1 illustrates an architecture of an enterprise network for performing split tunneling based on content type in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Overview of Techniques for Split Tunneling Based on Content Type

Video content traffic currently accounts for over 70% of Internet traffic. Video content traffic continues to increase. By some estimates, video content traffic will account for over 80% of Internet traffic by 2021.

Filtering/inspecting network traffic for security risks and/or other security analysis is performed by most enterprises to protect their computing infrastructure and enterprise data. However, filtering/inspecting video content traffic can require significant bandwidth/computing resources, such as at a security appliance/gateway.

For example, when a client device (e.g., remote client device/remote client) requests to access corporate resource (e.g., a remote user requests to access a file share/server or another resource on the enterprise network), the enterprise network can be configured to require a VPN tunnel (e.g., also referred to herein as tunnel) to connect to a VPN server or a firewall/security gateway in the enterprise network. In this example, in order to secure the client network traffic, an Information Technology (IT)/network/security admin configures a default route on a VPN tunnel to ensure that all client traffic passes through the tunnel. In this example configuration, a firewall or other security device (e.g., a firewall/security server, appliance, or virtual server/appliance) in the enterprise network can inspect and control the traffic. However, if the user is using a web browser (e.g., or another client application) to, for example, stream online video/audio content on the client device, then the video/audio traffic will also pass through the tunnel. As a result, the video/audio traffic generally consumes a relatively large amount of network bandwidth and computing resources at the firewall or other security device but may impose a relatively low security risk. As such, the IT/network/security admin may desire to configure the enterprise network such that the video/audio traffic does not pass through the tunnel if the destination is outside the enterprise network (e.g., video/audio content being streamed over the Internet from a remote server, such as Netflix or YouTube video streaming or Apple or Pandora music streaming, etc.).

Traditional split tunneling can only perform the network traffic split based on access route, destination domain, and/or source application. However, attempting to redirect certain traffic based on a domain (e.g., whether to redirect certain traffic to pass through the tunnel or not), such as based on URL filtering, is inadequate given that there are many distinct domains and also given that many video/audio sites/services utilize content delivery networks (CDNs) which effectively mask domains.

Traditional split tunneling cannot support a split based on content (e.g., content type, such as video content or audio content). Thus, what is needed are new techniques for performing split tunneling based on content type to facilitate, for example a network configuration that routes certain video/audio traffic outside of the tunnel (e.g., to reduce bandwidth and computing resources required to filter and/or analyze/inspect the network traffic associated with such video/audio traffic).

Thus, new and improved technical security solutions to provide split tunneling are needed. Moreover, new and improved techniques are needed to provide split tunneling based on content type to provide for more efficient network and security filtering/analysis activity (e.g., to reduce bandwidth and computing resources used to perform such security filtering/analysis activity on enterprise networks).

Accordingly, various techniques for split tunneling based on content type are disclosed. In some embodiments, a system, process, and/or computer program product for split tunneling based on content type includes monitoring session traffic received at a data appliance; determining if the session traffic is associated with a first content type; and redirecting the session traffic if the session traffic is associated with the first content type based on a policy. For example, the disclosed techniques for split tunneling based on content type can be implemented using a data appliance (e.g., a security platform, such as a security appliance/gateway, that includes a VPN client and is configured with a security policy) to perform split tunneling based on content type (e.g., video content type) to redirect the session traffic outside of the VPN tunnel (e.g., or to another data appliance) as will be further described below with respect to various embodiments.

In some embodiments, a system, process, and/or computer program product for split tunneling based on content type further includes decrypting the session traffic; and decoding the session traffic.

In some embodiments, the disclosed techniques for split tunneling based on content type facilitate excluding HTTP/HTTPS video and/or audio streaming traffic from the VPN tunnel. For example, video streaming applications, such as YouTube and Netflix, generally consume large amounts of bandwidth and computing resources on the gateway/firewall. By excluding lower risk video streaming traffic from the VPN tunnel, bandwidth/computing resources consumption on the firewall/gateway for such lower risk video streaming traffic is reduced.

Accordingly, the disclosed techniques for performing split tunneling based on content type can save a significant amount of network bandwidth and computing resources on the data appliance (e.g., security platform, such as a security appliance/gateway, that includes a VPN server and/or firewall). For example, split tunneling based on content type can also more efficiently utilize bandwidth and computing resources if the VPN server is hosted in the cloud (e.g., VPN as a cloud service, such as the commercially available GlobalProtect cloud service provided by Palo Alto Networks, Inc.).

Moreover, the disclosed techniques for performing split tunneling based on content type are more effective than just attempting to redirect certain traffic based on domains (e.g., whether to redirect certain traffic to pass through the tunnel or not). As discussed above, URL-based filtering alone is not an effective solution given that there are many distinct domains and many video/audio sites/services utilize content delivery networks (CDNs) which effectively mask domains.

These and other embodiments for performing techniques for split tunneling based on content type will now be further described below.

System Embodiments for Performing Split Tunneling Based on Content Type

Described herein are techniques that entities can use to help prioritize or route the security filtering/analysis for network traffic of certain content types of traffic to more efficiently utilize security filtering/analysis computing resources (e.g., bandwidth and computing resources of a security platform, such as a security appliance/gateway, that includes a VPN server and/or firewall). As one example, video content traffic (e.g., video streaming and/or other video content type traffic, which is also referred to herein as video traffic) is identified and then redirected outside of the VPN tunnel to avoid further filtering/analysis using the security platform (e.g., firewall/security appliance/gateway or other firewall/security platform implementation). As another example, audio content traffic (e.g., real-time voice communications and/or other audio content type traffic, which is also referred to herein as audio traffic) is identified and then redirected outside of the VPN tunnel to avoid further filtering/analysis using the security platform (e.g., firewall/security appliance/gateway or other firewall/security platform implementation). As yet another example, audio, video, or other content types of traffic are identified and routed to another security platform for filtering/analysis (e.g., firewall/security appliance/gateway or other firewall/security platform implementation). Thus, while a company may have as a default policy that traffic associated with an entertainment-oriented streaming video/audio service should be given the lowest priority for security filtering/analysis (to conserve bandwidth/computing resources), a second policy may route such content types of traffic to another security platform or to bypass filtering/security analysis altogether for certain content types of traffic and/or in combination with other criteria (e.g., video streaming of content from Netflix may be whitelisted, but video streaming of content from an unknown source/provider may not be whitelisted and may be routed for security filtering/analysis).

FIG. 1 illustrates an architecture of an enterprise network for performing split tunneling based on content type in accordance with some embodiments. In the example shown in FIG. 1, example client devices 104-110 include a laptop computer, a desktop computer, a Voice over Internet Protocol (VOIP) phone, and a tablet (respectively) present in an enterprise network 112 and a remote client device(s) 132 is in network communication with enterprise network 112 via external network/Internet 118 (e.g., the client devices are authorized computing devices with access to the enterprise network, which belongs to, for example, "Acme Company").

Data appliance 102 (e.g., a security platform, such as a gateway/firewall device, which may be implemented as a physical or a virtual service/computing device) is configured to enforce policies regarding communications between nodes inside network 112 (e.g., any of clients 104-110 and server 114) and nodes outside network 112 (e.g., remote client devices, such as remote client device 132 which includes a host agent (HA) 138 (e.g., a VPN client that can include other host-based security components, such as the GlobalProtect® client commercially available from Palo Alto Networks, Inc., which facilitates a secure, VPN connection with data appliance 102 as further discussed below), and any of remote servers 120-124, which may provide online content/services, such as video/audio streaming services) reachable via external network 118. Examples of the aforementioned policies include ones governing traffic shaping, Quality of Service (QoS), and routing of traffic including VPN tunnel routes. Other examples of policies include security policies such as ones requiring the scanning for threats in incoming (and/or outgoing) email attachments, website downloads, files exchanged through instant messaging programs, and/or other file transfers.

In some embodiments, appliance 102 is also configured to enforce policies (e.g., security/VPN policies) with respect to traffic based on a content type associated with the traffic, such as audio, video, and/or other content as further described below. For example, appliance 102 can be configured to perform split tunneling based on content type (e.g., audio, video, and/or other content type(s)) as will be further described below with respect to various embodiments.

Appliance 102 can take a variety of forms. For example, appliance 102 can be a dedicated device or set of devices. The functionality provided by appliance 102 can also be integrated into or executed as software on a general purpose computer, a computer server, a gateway, a virtual machine, and/or a network/routing device. In some embodiments, services provided by data appliance 102 are instead (or in addition) provided to a client, such as client 104 or 132 by software executing locally on the respective client device (e.g., host-based/agent security/VPN client software).

In some embodiments, appliance 102 includes an application identification component/engine (APP-ID) 116 which is configured to identify an application using various application signatures for identifying applications based on packet flow analysis. For example, application identification component/engine 116 can determine what type of traffic a session involves, such as Web Browsing—Social Networking; Web Browsing—News; SSH; FTP; and so on as further described below.

In some embodiments, appliance 102 also includes a content-ID component/engine 126 which is configured to identify analysis content type associated with session traffic. For example, content-ID component/engine 126 can determine a content type of traffic a session involves, such as audio, video, and/or other content type(s) as further described below.

A virtual private network (VPN) generally extends a private network and the resources contained in the private network across public (e.g., untrusted) networks such as the Internet. For example, a VPN can enable a host computer to send and receive data across shared or public, untrusted networks by emulating the properties of the private network, such as shares, server access, and printers by establishing and maintaining certain security and management policies of the private network. This is generally implemented by establishing a virtual point-to-point connection through a secure connection (e.g., secure network communications using various encryption techniques).

A VPN connection across the Internet logically operates as a wide area network (WAN) link between the sites. A VPN connection can provide a secure connection across the Internet that appears to a user as a private network communication. However, this communication actually occurs over a public, untrusted network (e.g., the Internet), which is, thus, referred to as a virtual private network (VPN).

For example, VPNs can be either remote-access (e.g., connecting an individual computer to a network) or site-to-site (e.g., connecting two networks together). In an enterprise computing environment (e.g., for corporations, government organizations, and/or other entities), remote-access VPNs can be used to allow employees to access their company's intranet from home or while traveling outside the office. Also, in an enterprise computing environment, site-to-site VPNs can be used to allow employees in geographically separated offices to share one cohesive virtual network (e.g., Santa Clara and Palo Alto offices for a company based in California can be connected using a site-to-site VPN).

Thus, VPN systems can be used to provide such site-to-site secure network connectivity for enterprise computing environments. These VPN systems can use various protocols to securely tunnel network traffic over untrusted, public networks and can be implemented using various levels of security and related requirements and configurations.

In particular, VPNs typically require remote access to be authenticated and make use of encryption techniques to prevent disclosure of private information. VPNs provide security through tunneling protocols and security procedures, such as encryption. VPNs can thereby provide for secure communications and confidential data communications such that even if traffic is sniffed, an attacker would only see encrypted data that he/she cannot understand. VPN communications also allow for message integrity to detect any instances of transmitted messages having been tampered with or otherwise compromised.

Well known secure VPN protocols include the following: Internet Protocol Security (IPSec); Transport Layer Security (SSL/TLS); Datagram Transport Layer Security (DTLS); and various other well-known VPN protocols. For example, when a VPN client communicates with an enterprise's server, it prepares a packet addressed to that server, encrypts it and encapsulates it in an outer VPN packet, such as an IPSec packet. This packet is then sent to the enterprise's VPN server (e.g., a server/firewall or other security gateway or appliance) over the public Internet. The inner packet is encrypted so that even if someone intercepts the packet over the Internet, they cannot get any information from it (e.g., they can see that the remote host is communicating with a server/firewall, but none of the contents of the communication can be understood due to the encryption). Thus, using such VPN techniques, secure communications can be provided over untrusted (e.g., public) networks, such as the Internet.

Tunnel endpoints generally need to authenticate before secure VPN tunnels can be established. User-created remote access VPNs can use passwords, biometrics, two-factor authentication, and/or other cryptographic techniques. Network-to-network VPN tunnels often use digital certificates (e.g., certificates) and/or passwords, as they permanently store the key(s) to allow the tunnel to establish automatically and without user intervention.

In some embodiments, data appliance 102 includes a VPN server component 136. For example, these techniques can be used to implement a more efficient and secure enterprise network for local and remote clients, such as remote client device(s) 132, that connect to the network using a VPN tunnel.

In some embodiments, data appliance 102 further includes a policy (e.g., a security/VPN policy that includes one or more rules) for implementing the disclosed techniques for performing split tunneling based on content type.

In some embodiments, each client device, such as a desktop/laptop/tablet/phone/other mobile computing device running Windows, iOS, Mac, Android, Linux, and/or other OS, includes a VPN client running on the device (e.g., client devices 104-110 and/or 132 shown in FIG. 1), and the data appliance (e.g., security platform, such as data appliance 102 shown in FIG. 1) includes a VPN server and/or firewall to which the client creates a tunnel. When a user browses online video/audio using, for example, HTTP/HTTPS, the request initially passes through a tunnel to the data appliance. The data appliance decrypts the traffic if it is an HTTPS request such as further described below. The data appliance then identifies if the HTTP/HTTPS request is a video/audio content type that matches a video/audio traffic content type configured in a security policy, such as YouTube, Netflix, etc. If the request matches a video/audio traffic content type (e.g., a whitelisted video/audio traffic content type) configured in the security policy, then the data appliance sends back an HTTP/HTTPS redirect request with the same destination to the client. In some cases, the redirect TCP packet includes a special TCP option (e.g., a special redirect request, which can be used for Netflix or other video/audio streaming applications/services) to instruct the VPN client that this HTTP/HTTPS request should be routed outside the VPN tunnel. As such, when the VPN client receives this special redirect request, it will cache/store the destination and notify this special redirect request to the client. Subsequently, when the browser executes the redirect and creates a new TCP connection to the audio/video site/service (e.g., web site streaming site/service, such as YouTube, Netflix, etc.), the VPN client binds this connection to the physical adapter (PA) (e.g., rather than the virtual adapter (VA)) to route the video/audio traffic of this connection/session outside of the tunnel to bypass security filtering/analysis at the data appliance thereby conserving bandwidth and computing resources of the data appliance for performing security filtering/analysis on other traffic. These and other embodiments for performing split tunneling based on content type will be further described below.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable. Further, although illustrated as a single element in FIG. 1, enterprise network 112 can comprise multiple networks, any/each of which can include one or multiple data appliances or other components that embody techniques described herein. For example, the techniques described herein can be deployed by large, multi-national companies (or other entities) with multiple offices in multiple geographical locations. And, while clients 104-110 are illustrated in FIG. 1 as connecting directly to data appliance 102, it is to be understood that one or more intermediate nodes (e.g., routers, switches, and/or proxies) can be and typically are interposed between various elements in enterprise network 112.

Figure 2:
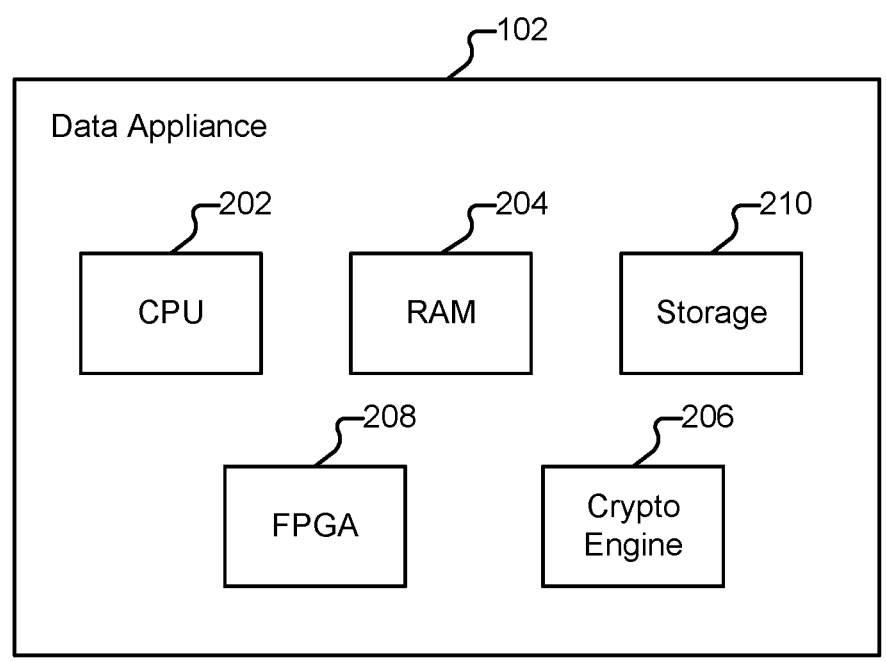
FIG. 2 illustrates an embodiment of physical components of a data appliance.

FIG. 2 illustrates an embodiment of physical components of a data appliance. The example shown is a representation of physical components that are included in appliance 102 in some embodiments. Specifically, appliance 102 includes a high performance multi-core CPU 202 and RAM 204. Appliance 102 also includes a storage 210 (such as one or more solid state drives or other storage mechanisms), which is used to store policy information (e.g., in policies 312 of FIG. 3) and other configuration information, such as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Figure 3:
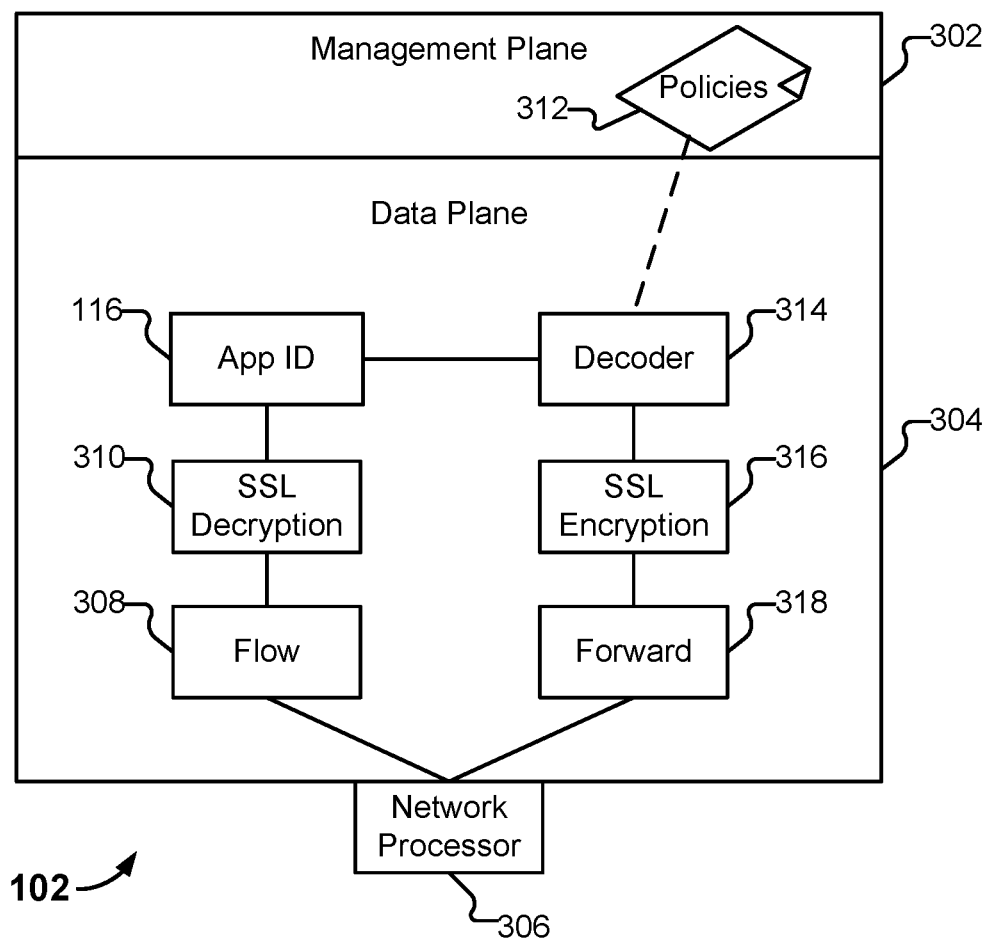
FIG. 3 illustrates an embodiment of physical components of a data appliance.

FIG. 3 illustrates an embodiment of physical components of a data appliance. The example shown is a representation of logical components that can be included in data appliance 102 in some embodiments. Specifically, data appliance 102 includes a management plane 302 and a data plane 304. The management plane is responsible for managing user interactions, such as by providing a user interface for configuring policies and viewing log data. The data plane is responsible for managing data, such as by performing packet processing and session handling. Network processor 306 is configured to receive packets from client devices, such as client device 110, and provide them to data plane 304 for processing. When flow module 308 identifies the packets as being part of a new session, it creates a new session flow. Subsequent packets will be identified as belonging to the session based on a flow lookup. If applicable, SSL decryption is applied by SSL decrypter 310. Otherwise, processing by SSL decrypter 310 is omitted. Application identification module 116 is configured to determine what type of traffic the session involves. As one example, application identification module 116 can recognize a GET request in received data and conclude that the session requires an HTTP decoder. In some cases, e.g., a web browsing session, the identified application can change, and such changes will be noted by appliance 102. For example a user may initially browse to a corporate Wiki (classified based on the URL visited as "Web Browsing—Productivity") and then subsequently browse to a social networking site (classified based on the URL visited as "Web Browsing—Social Networking"). For each type of protocol, there exists a corresponding decoder 314. Based on the determination made by application identification module 116, the packets are sent to an appropriate decoder 314. Decoder 314 is configured to assemble packets (which may be received out of order) into the correct order, perform tokenization, and extract out information. Decoder 314 also performs signature matching to determine what should happen to the packet. Decoder 314 can enforce rules in policies 312 (e.g., a security policy, which can include one or more rules related to split tunneling based on content type as described herein) provided by management plane 302. As needed, packets are re-encrypted by SSL encryption module 316 and then provided to forward module 318 for transmission to an external server, such as server 124.

As will now be apparent, the techniques for performing split tunneling based on content type can be implemented on various content types including those described above to facilitate split tunneling based on content type, which can save a significant amount of network bandwidth and computing resources for security filtering/analysis on a data appliance (e.g., security platform that includes a VPN server and/or firewall).

Example Protocol Sequence for HTTP/HTTPS Video Streaming Applications

Figure 4:
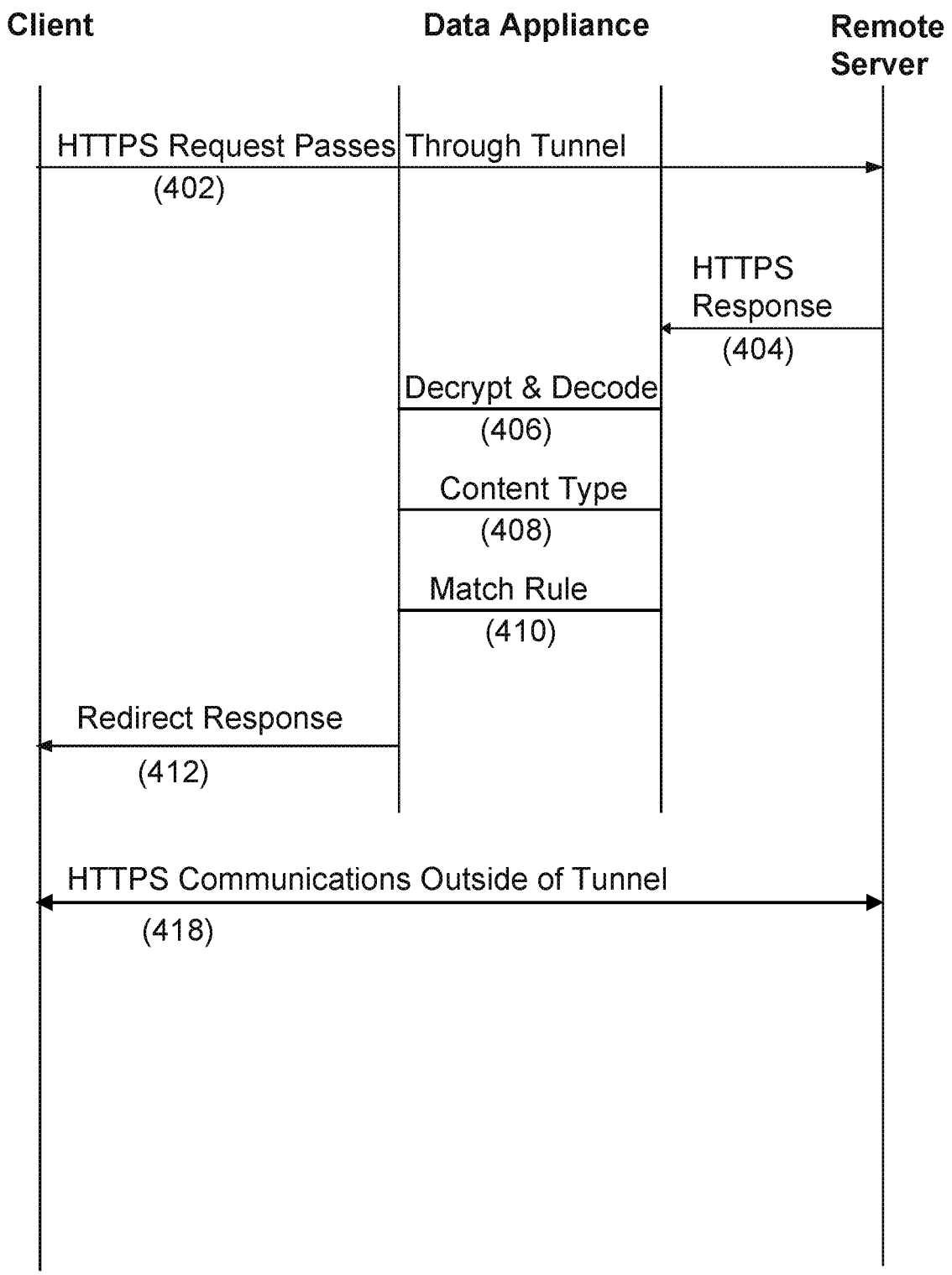
FIG. 4 illustrates a protocol sequence diagram illustrating split tunneling based on content type in accordance with some embodiments.

FIG. 4 illustrates a protocol sequence diagram illustrating split tunneling based on content type in accordance with some embodiments. The example protocol sequence shown is performed by appliance 102 in some embodiments.

In some embodiments, each client device, such as a desktop/laptop/tablet/phone/other mobile computing device running Windows, iOS, Mac, Android, Linux, and/or other OS, includes a VPN client running on the device (e.g., client devices 104-110 and/or 132 shown in FIG. 1), and the data appliance (e.g., security platform, such as data appliance 102 shown in FIG. 1) includes a VPN server and/or firewall to which the client creates a tunnel. When a user browses online video/audio using, for example, HTTP/HTTPS, the request initially passes through a tunnel to the data appliance. The data appliance decrypts the traffic if it is an HTTPS request such as further described below. The data appliance then identifies if the HTTP/HTTPS request is a video/audio content type that matches a video/audio traffic content type configured in a security policy, such as YouTube, Netflix, etc. If the request matches a video/audio traffic content type (e.g., a whitelisted video/audio traffic content type) configured in the security policy, then the data appliance sends back an HTTP/HTTPS redirect request with the same destination to the client. In some cases, the redirect TCP packet includes a special TCP option (e.g., a special redirect request, such as further described below) to instruct the VPN client that this HTTP/HTTPS request should be routed outside the tunnel. As such, when the VPN client receives this special redirect request, it will cache/store the destination and notify this special redirect request to the client. Subsequently, when the browser executes the redirect and creates a new TCP connection to the audio/video site/service (e.g., web site streaming site/service, such as YouTube, Netflix, etc.), the VPN client binds this connection to the physical adapter (PA) (rather than the virtual adapter (VA)) to route the video/audio traffic of this connection outside of the tunnel to bypass security filtering/analysis at the data appliance thereby conserving bandwidth and computing resources of the data appliance for performing security filtering/analysis on other traffic.

Referring to FIG. 4, a user browses for only content (e.g., HTML/web content such as online web site content, audio content such as streamed audio content, video content such as streamed video content, etc.) using a web browser executed on a client device (e.g., client device 104-110 or 132 as shown in FIG. 1). Specifically, an HTTP Secure (HTTPS) request initially passes through a tunnel at 402 from the client to the data appliance (e.g., a security platform, such as data appliance 102 shown in FIG. 1) and from the data appliance to a remote server associated with a destination of a requested URL/URI (e.g., remote server 120-124 as shown in FIG. 1). At 404, the remote server sends an HTTPS response. At 406, the data appliance receives the HTTPS response and then decrypts and decodes the HTTPS response. At 408, the data appliance identifies a content type associated with the HTTPS response. At 410, the data appliance determines whether the content type associated with the HTTPS response matches a rule (e.g., a rule in policies 312 as shown in FIG. 3, which can include one or more rules related to split tunneling based on content type as described herein). In this example, the data appliance determines that the HTTPS response matches a rule based on the identified content type (e.g., video, audio, and/or other content type, such as video content for YouTube, Netflix, etc.). Specifically, the request matches a video/audio traffic content type (e.g., a whitelisted video/audio traffic content type) configured in the policy (e.g., security/VPN policy), and the data appliance sends back a redirect response with the same destination to the client at 412. In some cases, the redirect TCP packet includes a special TCP option (e.g., a special redirect request) to instruct the client device (e.g., VPN client) that this HTTPS request should be routed outside the tunnel. As such, when the VPN client receives this special redirect request, it will cache/store the destination and notify this special redirect request to the client. Subsequently, when the browser executes the redirect and creates a new TCP connection to the audio/video site/service (e.g., web site streaming site/service, such as YouTube, Netflix, etc.), the VPN client binds this connection to the physical adapter (PA) (rather than the virtual adapter (VA)) to route the video/audio traffic of this connection outside of the tunnel as shown at 418 to bypass security filtering/analysis at the data appliance thereby conserving computing resources of the data appliance for performing security filtering/analysis on other traffic.

In an example implementation, the disclosed split tunneling based on content type can facilitate split tunneling for one or more of the following example types of video streaming: MPEG-4 (MP4), WebM, and MPEG-2 TS (MP2T). The content identifier (e.g., Content-ID 126 of data appliance 102 as shown in FIG. 1) checks the HTTP/HTTPS response payload and identifies the content as MP4, WebM, or MP2T based on one or more of the following: file format, magic string, request type, response header content type, and payload pattern. For example, an "ftypdash" file format indicates this is an MP4 file. As another example, for WebM, the content identifier checks the magic string 0x1a45dfa3 at the beginning of the HTTP/HTTPS response payload. As yet another example, for MP2T, the content identifier checks the request URL/URI ends with an extension ".ts", and the HTTP/HTTPS response header has "Content-Type: video/mp2t" or the first payload byte is 0x47.

In this example implementation, APP-ID (e.g., APP-ID 116 of data appliance 102 as shown in FIG. 1) can be utilized for various online video streaming services, such as YouTube, Netflix, and Dailymotion, to assist in the process for identifying video traffic in the HTTP/HTTPS response. Specifically, if the traffic is identified as YouTube, Netflix, or Dailymotion streaming, and there is "Content-Type: application/octet-stream" or "Content-Type: video/" in the HTTP/HTTPS response header, then the traffic can be identified as a video content type to facilitate split tunneling based on video content type.

Example Use Case Scenarios for HTTP/HTTPS Video Streaming Applications

Suppose a laptop (e.g., client device 132 of FIG. 1) is assigned to an Acme Company employee, Alice, who is a member of the Engineering group. A variety of applications are installed on Alice's laptop, including ones used for mission critical purposes (e.g., monitoring and communicating with an important resource, such as a source code repository on the Acme Company enterprise network) and ones used for Alice's amusement (e.g., a streaming video player, such as the Netflix app, and/or a web browser that Alice can generally utilize to access/view/stream audio, video, or other content types available online on the Internet). In particular, suppose Alice is working remote (e.g., from home or another remote location) on her laptop and is connected to her Acme Company network via a VPN using a VPN client (e.g., GlobalProtect client) and is using a web browser (e.g., Chrome, Internet Explorer, Safari, or another web browser) on her laptop to access, for example, Netflix video content. In this scenario, the web browser connects to a video streaming service, such as provided by Netflix. The HTTPS connection is using source port 40000 and destination port 443 (e.g., a tunnel over 443). The firewall (e.g., data appliance 102 as shown in FIG. 1) decrypts and decodes the session traffic over the VPN tunnel and then detects that a content type associated with the session traffic is a video content type associated with the Netflix streaming service as similarly described above. In this example, the firewall is configured with a rule/policy (e.g., configured by an administrator, such as an IT/network/security administrator of network 112) for performing split tunneling based on content type, and specifically, for such video content type of traffic, the firewall is configured to send a special redirect response using TCP options as similarly described above. As such, further/subsequent communications between Alice's web browser/client device and the Netflix streaming service can be performed outside of the tunnel (e.g., to bypass the gateway/firewall, which reduces bandwidth and computing resource demands at the gateway/firewall for such Netflix video content streaming traffic being streamed by Alice). However, other session traffic, such as accessing a resource on the ACME Corporate network (e.g., an important resource, such as a source code repository or other important resource on the Acme Company enterprise network) will still be routed through the tunnel (e.g., for filtering/inspection at the gateway/firewall).

Alternatively, instead of using TCP options in a special redirect response, a special port can be used or out of band communications can be used between the VPN client executed on Alice's laptop and the firewall to map the original destination ports to alternative destination ports in order to bind to the physical adapter such that further/subsequent communications between Alice's web browser/client device and the video streaming service can be performed outside of the tunnel (e.g., to bypass the gateway/firewall, which reduces bandwidth and computing resource demands at the gateway/firewall for video content streaming traffic being streamed by Alice). In this case, such a redirect to Alice's web browser causes the web browser to send another HTTPS request using the original destination IP address and special destination port number (e.g., in an example implementation, the VPN client intercepts this new connection based on the special destination port, changes the special port of the connection to the original one, and then binds the request connection to the physical adapter to bypass the tunnel). However, as similarly discussed above, other session traffic, such as accessing a resource on the ACME Corporate network (e.g., an important resource, such as a source code repository or other important resource on the Acme Company enterprise network) will still be routed through the tunnel.

In an example implementation, for each of these special redirect response scenarios, the redirect response can be verified as being received within a predetermined time threshold (e.g., 2 seconds or some other threshold time period) to avoid, for example, spoofing attacks. Accordingly, these various techniques can be used to perform the disclosed techniques for split tunneling based on content type as will now be further described below.

Assume that Alice's browsing later changes (e.g., from Netflix video content streaming to a social networking web site or another web site that is not a video content type or other content type that is configured to bypass the tunnel for firewall inspection), then the new session traffic passes through the tunnel and is inspected by the gateway/firewall. As another example, assume that Alice clicks on a link while watching streamed video content, such will trigger a new session that will similarly be determined as to whether such should pass through the tunnel and be inspected by the gateway/firewall or can pass outside of the tunnel to bypass gateway/firewall inspection based on the security policy configured for the Acme Company enterprise network.

In another example implementation, the gateway/firewall (e.g., default/critical resources firewall(s) for Acme Company enterprise network) can be configured to bind certain content types of traffic, such as video content types of traffic, to another virtual adapter (VA) to route such video/other content types of traffic to another/secondary gateway/firewall (e.g., non-critical resources firewall(s) for Acme Company enterprise network). In this example, another/secondary gateway/firewall can be designated for monitoring certain content types of traffic. As such, access to important resources may not be impacted when users are streaming video content as such will not pass through the default/critical resources gateway/firewall(s).

Accordingly, the disclosed techniques for split tunneling based on content type facilitate excluding HTTP/HTTPS video streaming traffic from the VPN tunnel. For example, video streaming applications, such as YouTube and Netflix, generally consume large amounts of bandwidth and computing resources on the gateway/firewall. By excluding lower risk video streaming traffic from the VPN tunnel, bandwidth and computing resources consumption on the gateway/firewall for such lower risk video streaming traffic is reduced.

Example Configuration Interfaces

Figure 5A:
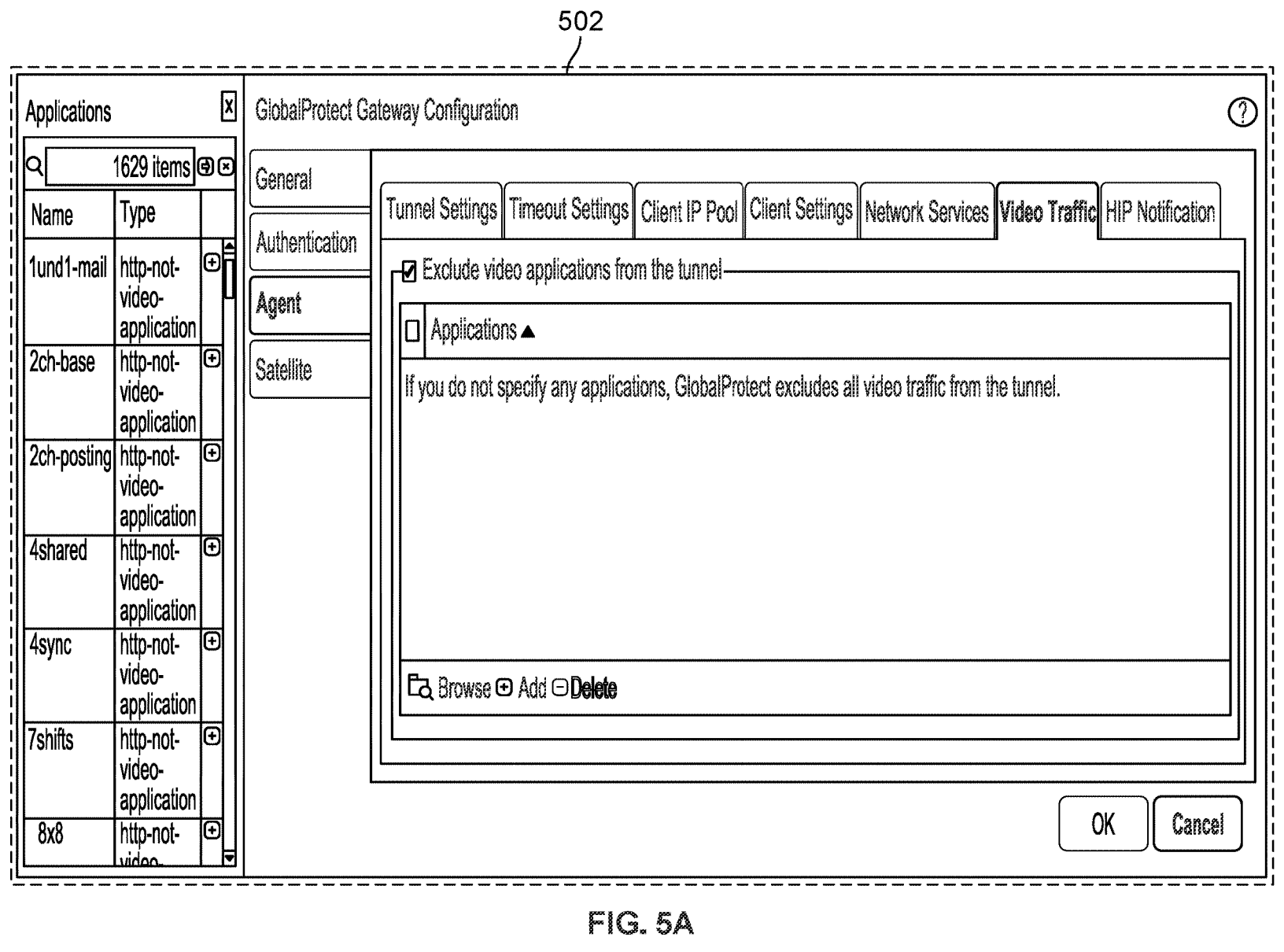
Figure 5B:
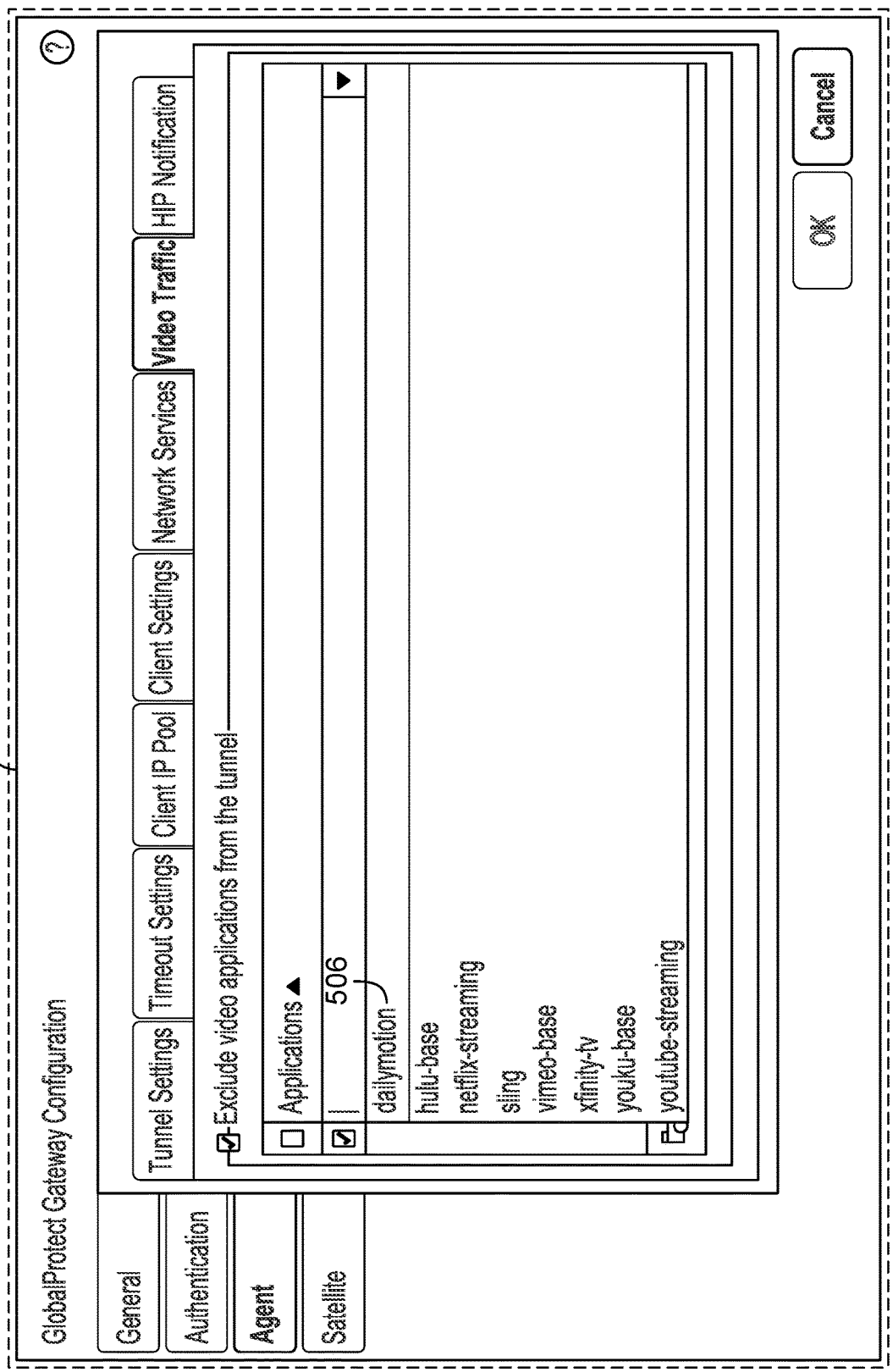

FIGS. 5A and 5B illustrate an embodiment of an interface for providing split tunneling based on content type in accordance with some embodiments. The example configuration interface can be provided by appliance 102 in some embodiments.

Referring to FIG. 5A, interface 502 is shown to an administrator (e.g., IT/network/security admin) of appliance 102 in response to the administrator accessing a configuration portal (e.g., GlobalProtect Gateway Configuration portal). Interface 502 can be used to exclude video streaming traffic from the VPN tunnel (e.g., enable the option to exclude video applications from the VPN tunnel).

Referring to FIG. 5B, interface 504 is shown to an administrator of appliance 102 in response to the administrator selecting the option to exclude video streaming traffic from the VPN tunnel using the configuration portal (e.g., GlobalProtect Gateway Configuration portal). Interface 504 can be used to exclude one or more video applications from the VPN tunnel, such as the Dailymotion video application as shown at 506.

As will now be apparent, the disclosed techniques for performing split tunneling based on content type can be implemented using various user interfaces/GUI designs.

Additional example processes for the disclosed techniques for performing split tunneling based on content type will now be described.

Process Embodiments for Split Tunneling Based on Content Type

Figure 6:
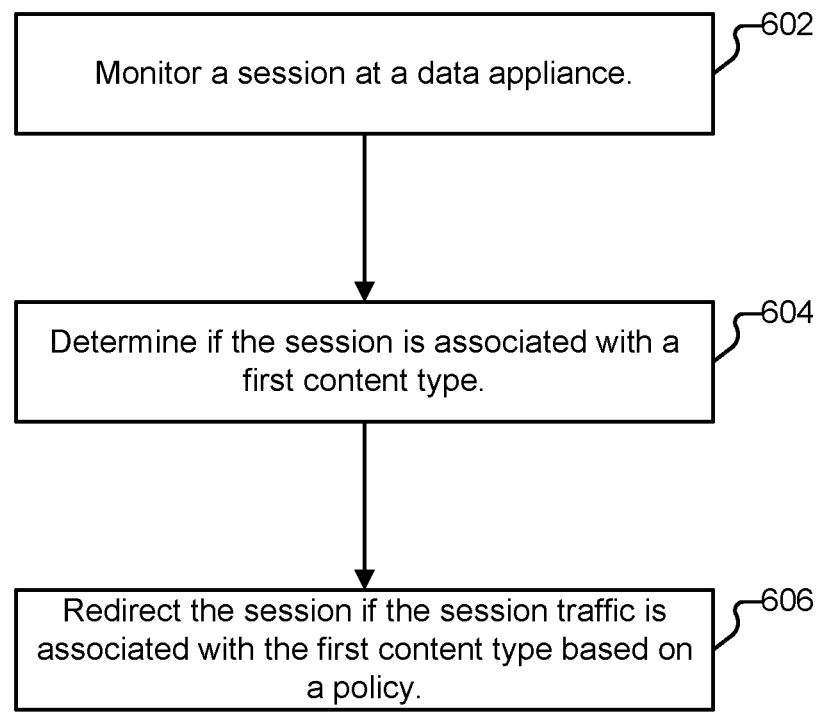
FIG. 6 is a flow diagram of a process for performing split tunneling based on content type in accordance with some embodiments.

FIG. 6 is a flow diagram of a process for performing split tunneling based on content type in accordance with some embodiments. In some embodiments, a process as shown in FIG. 6 is performed by the data appliance (e.g., security gateway/platform) and techniques as similarly described above including the embodiments described above with respect to FIGS. 1-5B.

The process begins at 602. At 602, monitoring a session (e.g., session traffic) at a data appliance (e.g., security gateway/platform) is performed. At 604, determining if the session (e.g., session traffic) is associated with a first content type (e.g., audio content type, video content type, or another content type) is performed. At 606, redirecting the session if the session traffic is associated with the first content type based on a policy is performed. For example, the data appliance can redirect the session traffic outside of the VPN tunnel, such as similarly described above.

Figure 7:
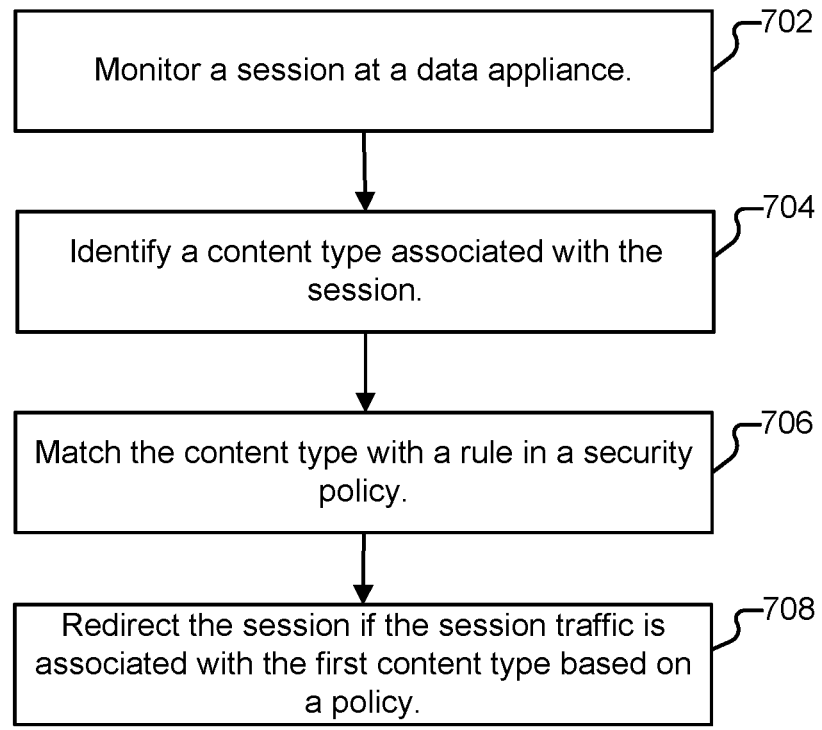
FIG. 7 is another flow diagram of a process for performing split tunneling based on content type in accordance with some embodiments.

FIG. 7 is another flow diagram of a process for performing split tunneling based on content type in accordance with some embodiments. In some embodiments, a process as shown in FIG. 7 is performed by the data appliance (e.g., security gateway/platform) and techniques as similarly described above including the embodiments described above with respect to FIGS. 1-5B.

The process begins at 702. At 702, monitoring a session (e.g., session traffic) at a data appliance (e.g., security gateway/platform) is performed. At 704, identifying a content type associated with the session is performed. At 706, matching the content type with a rule in a policy (e.g., security/VPN policy) is performed. At 708, redirecting the session (e.g., using TCP options or a different source/destination port, such as similarly described above) if the session traffic is associated with the first content type based on a policy is performed. For example, the data appliance can redirect the session traffic outside of the VPN tunnel, such as similarly described above. As another example, the data appliance can redirect the session traffic to another data appliance (e.g., firewall/VPN gateway/platform), such as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing split tunneling based on content type, comprising:
a physical adapter;
a Virtual Private Network (VPN) with a virtual adapter;
a processor of a security platform configured to:
monitor session traffic received from a client at the security platform, wherein the session traffic is initially routed through a Virtual Private Network (VPN) tunnel, and wherein the session traffic is decrypted and decoded at the security platform;
determine, from the decrypted and decoded session traffic, if the session traffic is associated with a first content type, wherein the first content type includes video network or audio network traffic; and
send a special redirect response, the special redirect response utilizing a special port option or a TCP option, to re-route the session traffic from the virtual adapter of the VPN tunnel to the physical adapter outside of the VPN tunnel, if the session traffic is associated with the first content type based on a security policy, wherein the session traffic redirect is based on the security policy to perform split tunneling, wherein the split tunneling is based on different content types based on the security policy to reduce bandwidth and computing resources used for performing security inspection of network traffic associated with video network traffic or audio network traffic, and wherein the session traffic is redirected outside of the VPN tunnel using an HTTP/HTTPS redirect request with the same destination as the client after determining that the session traffic is associated with the first content type; and
a memory coupled to the processor and configured to provide the processor with instructions.

2. The system recited in claim 1, wherein the security platform comprises a security appliance that includes a VPN client.

3. The system recited in claim 1, wherein the security platform comprises a gateway that includes a VPN client.

4. The system recited in claim 1, wherein the session traffic is initially routed through a tunnel.

5. The system recited in claim 1, wherein the session traffic is initially routed through a tunnel, and the session traffic is redirected outside of the tunnel.

6. The system recited in claim 1, wherein the first content type comprises an approved audio traffic content type that is configured in the security policy.

7. The system recited in claim 1, wherein the first content type comprises an approved video content type that is configured in the security policy.

8. The system recited in claim 1, wherein the session traffic is encrypted, and wherein the processor is further configured to:
decrypt the session traffic.

9. The system recited in claim 1, wherein the session traffic is encrypted, and wherein the processor is further configured to:
decrypt the session traffic; and
decode the session traffic.

10. A method for performing split tunneling based on content type, comprising:
monitoring session traffic received from a client at a security platform, wherein the session traffic is initially routed through a Virtual Private Network (VPN) tunnel, and wherein the session traffic is decrypted and decoded at the security platform;
determining, from the decrypted and decoded session traffic, if the session traffic is associated with a first content type, wherein the first content type includes video network or audio network traffic; and
send a special redirect response, the special redirect response utilizing a special port option or a TCP option, to re-route the session traffic from a virtual adapter of the VPN tunnel to a physical adapter outside of the VPN tunnel, if the session traffic is associated with the first content type based on a security policy, wherein the session traffic redirect is based on the security policy to perform split tunneling, wherein the split tunneling is based on different content types based on the security policy to reduce bandwidth and computing resources used for performing security inspection of network traffic associated with video network traffic or audio network traffic, and wherein the session traffic is redirected outside of the VPN tunnel using an HTTP/HTTPS redirect request with the same destination as the client after determining that the session traffic is associated with the first content type.

11. The method of claim 10, wherein the security platform comprises a security appliance that includes a VPN client.

12. The method of claim 10, wherein the security platform comprises a gateway that includes a VPN client.

13. The method of claim 10, wherein the session traffic is initially routed through a tunnel.

14. The method of claim 10, wherein the session traffic is initially routed through a tunnel, and the session traffic is redirected outside of the tunnel.

15. The method of claim 10, wherein the first content type comprises an approved audio traffic content type that is configured in the security policy.

16. The method of claim 10, wherein the first content type comprises an approved video content type that is configured in the security policy.

17. The method of claim 10, wherein the session traffic is encrypted, and further comprising:
   decrypting the session traffic.

18. The method of claim 10, wherein the session traffic is encrypted, and further comprising:
   decrypting the session traffic; and
   decoding the session traffic.

19. A computer program product for performing split tunneling based on content type, the computer program product being embodied in a non-transitory, tangible computer readable storage medium and comprising computer instructions for:
   monitoring session traffic received from a client at a security platform, wherein the session traffic is initially routed through a Virtual Private Network (VPN) tunnel, and wherein the session traffic is decrypted and decoded at the security platform;
   determining, from the decrypted and decoded session traffic, if the session traffic is associated with a first content type, wherein the first content type includes video network or audio network traffic; and
   send a special redirect response, the special redirect response utilizing a special port option or a TCP option, to re-route the session traffic from a virtual adapter of the VPN tunnel to a physical adapter outside of the VPN tunnel, if the session traffic is associated with the first content type based on a security policy, wherein the session traffic redirect is based on the security policy to perform split tunneling, wherein the split tunneling is based on different content types based on the security policy to reduce bandwidth and computing resources used for performing security inspection of network traffic associated with video network traffic or audio network traffic, and wherein the session traffic is redirected outside of the VPN tunnel using an HTTP/HTTPS redirect request with the same destination as the client after determining that the session traffic is associated with the first content type.

20. The computer program product recited in claim 19, wherein the security platform comprises a security appliance that includes a VPN client.

* * * * *